March 16, 1965     J. S. THOMPSON ETAL     3,173,332

BACKLIT PROJECTION SCREEN

Filed March 25, 1963

POUL B. ROULUND
JAMES S. THOMPSON
INVENTORS

BY *Allen E. Botney*

ATTORNEY

… … …

United States Patent Office 3,173,332
Patented Mar. 16, 1965

3,173,332
BACKLIT PROJECTION SCREEN
James S. Thompson, Playa Del Rey, and Poul B. Roulund, Redondo Beach, Calif., assignors to FMA, Inc., El Segundo, Calif., a corporation of California
Filed Mar. 25, 1963, Ser. No. 267,628
2 Claims. (Cl. 88—28.93)

The present invention relates in general to improvements in viewing screens and more particularly relates to a new type of backlit projection screen.

Screens of the present invention may be used in any viewing system in which an image is projected on one side of the screen and viewed from the opposite side. In using projection screens of the kind mentioned, it will at once be recognized that it is desirable to minimize as much as possible reflection and dispersal of the projected light and thereby transmit a maximum amount of this light in a forward direction only, that is to say, toward the viewer, since by substantially eliminating back scattering of the light, the micro-contrast of the image is very greatly improved, which means that a much sharper image is produced.

It is, therefore, an object of the present invention to provide a backlit projection screen that substantially eliminates internal reflections.

It is another object of the present invention to provide a backlit projection screen having properties such that the micro-contrast of pictures presented on it are greatly improved.

It is a further object of the present invention to provide a high-gain backlit projection screen.

The scattering in a forward direction only of the light projected onto a screen from the rear can be achieved, it has been discovered, by means of a layer of tiny randomly distributed lenses on one face of the screen that are substantially hemispherical in shape. The surface of the screen having this minute lenticular array thereon is the projection surface, the picture or light image being projected onto the viewing surface through the screen from the rear. The essence of the invention lies in the nature of the lenticular surface of the screen. More specifically, it lies in the fabrication of a screen having an undulating projection surface, the valleys and crests of the undulations constituting the above-said lenticular array. While the undulations are not identical with each other, they nevertheless eliminate the sharp corners and crevices found on the projection surface of conventional screens which cause the loss of quality in those screens.

The novel features which are believed to be characteristic of the invention, together with further objects and advantages thereof, will be better understood from the following description considered in connection with the accompanying drawing in which a screen according to the present invention and a method for making such a screen are illustrated by way of example. It is to be expressly understood, however, that the drawing is for the purpose of illustration and description only and is not intended as a definition of the limits of the invention.

Figure 1:
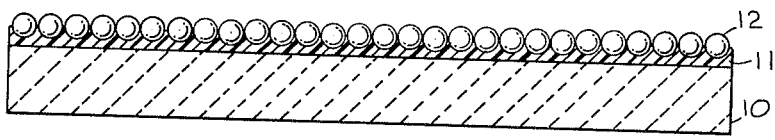
FIGURE 1 is an illustration that can be used to explain the first couple of steps involved in the process of fabricating a screen according to the present invention.

Referring now to the drawings and in particular to FIG. 1 therein, a transparent base material 10 such as Lucite, Plexiglas, or plain glass, is dipped into a bath of a transparent adhesive substance, such as, for example, a silicone potting compound, an example of which is the substance taught in the patent to John T. Goodwin, Jr., Patent No. 2,857,356, entitled "Organopolysiloxane Compositions Having Pressure-Sensitive Adhesive Properties" and issued October 21, 1958. This silicone potting compound which will be used in the description that follows, is one of a series of low-temperature curing compounds that cures with the addition of a catalyst to form a completely transparent, resilient solid.

Having dipped base material 10 into the silicone potting compound bath, the excess of this silicone potting substance is permitted to run off until a very thin, even coat 11 of it remains on the surface of the base. The abovesaid coated structure is then partially cured, either at room temperature for several hours, for example, six hours, or in an oven maintained at 150° Fahrenheit for approximately twenty minutes, until the silicone potting coating is in a tacky state. It should be mentioned here that the silicone potting coating may be applied to base 10 in a manner other than by dipping. More specifically the silicone potting material can be applied by simply pouring it over the surface of the base. Base 10 is then tilted at an angle so that all excess silicone potting material will run off and thereby leave a uniform coating on it.

It should also be mentioned that it is important to de-gas the silicone potting mixture before it is applied to base 10 in order to get rid of any air bubbles that might be trapped in it. De-gassing is accomplished by placing the material in a vacuum chamber and letting the air 'boil" off. Unless this is done, the process may result in a screen surface of somewhat inferior quality. It is advisable to again de-gas the silicone potting material after it has been coated onto the base since it is always possible that air may have been trapped in it during its application to the base. Here again, the de-gassing is accomplished by placing the coated base in a vacuum chamber and is kept there until all air bubbles that may have been trapped are boiled off, that is to say, until no more air bubbles are seen bursting at the surface of the coating. The coated base is then taken out of the vacuum chamber and cured for approximately six hours at room temperature.

At this time and with the aid of an ordinary paint brush, tiny glass beads or balls, which may be either hollow or solid, are brushed onto the surface of silicone potting coating 11, and because of its tacky state, the beads will become half-immersed in it, that is to say, the beads will sink into the coating to a depth substantially equal to their radii. With sufficient brushing, a layer of randomly arranged beads 12 is formed on and completely covers the surface of the coating. With respect to the tiny glass beads or balls mentioned, the beads may be purchased with diameters down to a micron but the diameter of the beads actually used depends upon the resolution desired for the projection screen fabricated, the resolution being inversely proportional to the size of the beads. Thus, for example, to obtain an extremely high resolution screen, for example a resolution of 160 lines per millimeter, beads of about six to eight microns in diameter would be used. As stated earlier, the beads may be solid or hollow, the solid beads being somewhat easier to handle.

Beads of the type mentioned are commercially available in sizes that range from a diameter of approximately one micron to a fraction of an inch.

Once the beads have been brushed onto the thin adhesive coating, thereby forming a layer of them randomly arranged, the completeness with which the job has been done may be checked visually by projecting light onto bead layer 12 and simultaneously looking through the combination toward a light source from the bottomside of base 10. If the beads have been properly packed together so that a high enough and uniform enough bead density has been attained, then the light source will not be visible by the viewer. On the other hand, if the packing or bead density is not adequate, or if either of elements 10 or 11 is defective, then tell-tale marks will be observed during the course of this visual test, such as streaks, brush marks, or ripples if the silicone potting coating is not on evenly. Assuming that a good structure has been fabricated thus far, the final step is that of properly curing the combination comprising elements 10, 11 and 12.

In curing this combination, it is preferably left at room temperature until (1) layer 11 becomes quite hard, thereby firmly or rigidly holding in place beads 12 that are half-embedded in it, and (2) layer 11 is quite dried out, or else there may be a discoloring of the aluminum layer that will later be deposited over the beads due to a chemical reaction between the aluminum and the catalyst in the potting compound mixture. By doing a thorough job of curing the layer, for example, by curing it at room temperature for two or more days, the possibility of a reaction and the consequent discoloring is avoided. Of course, the needed curing may be expedited by placing the combination in an oven maintained at higher than room temperature, for example, at 150° Fahrenheit.

Figure 2:
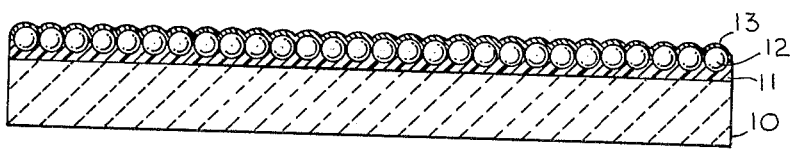
FIGURE 2 shows the FIG. 1 apparatus with an additional coating deposited over it.

The next step in the process is that of depositing a thin film or coating of metal over the layer of beads 12. While any one of a number of different metals may be used for this purpose, aluminum is preferred because it is relatively inexpensive, deposits easily and produces very satisfactory results. An aluminum film, designated 13, is shown deposited over bead layer 12 in FIG. 2. Vacuum deposition may be utilized which involves placing the FIG. 1 combination in a vacuum chamber in the presence of an aluminum rod or bar. By appropriately heating the rod or bar, some of the aluminum is evaporated off and thereafter becomes deposited on beads 12. Deposition is continued until the aluminum film appears equally white when viewed from either side, that is to say, until the whiteness of the aluminum layer appears to be the same whether viewed from above or through base 10. When it is equally white, the aluminum film is then at the proper or desired thickness.

The importance of film 13, whether it be made of aluminum or some other metal, is twofold. First, it enters the interstices or spaces between the beads and thereby covers up those portions of layer 11 beneath the beads that are exposed through these crevices or spaces. In other words, by depositing film 13, a very thin metal sheet is formed over beads 12 that follows the spherical contours of the beads and, at the same time, provides a barrier between the layer and any substance that may be poured over the beads later. Second, and more important, layer 13 also rounds off the corners formed by the beads abutting one another. In other words, a corner is formed at the point of contact between two adjacent beads and the metal layer fills in some of this corner to produce a smooth transition between the surfaces of the two beads. It has been found from experience that these transitional surfaces are also of spherical contour, but of smaller radius than that of the spherical surfaces formed over the beads. This is important in producing the undulating screen surface previously mentioned.

It was mentioned above that layer 13 was a metal layer and also that it was deposited by vacuum deposition. It should be emphasized, therefore, that materials other than metal may be used for the layer and also that it may be formed by techniques other than by vacuum deposition. Thus, instead of metal, any material can be used that will readily release, or that can be made to release by the addition of a release agent, from a mold material. In addition, the layer, whatever its composition, may also be deposited by spraying, dipping, and the like. However, in the description that follows, layer 13 will be referred to as a metal layer, but it should be kept in mind that other materials may be employed as well.

Figure 3:
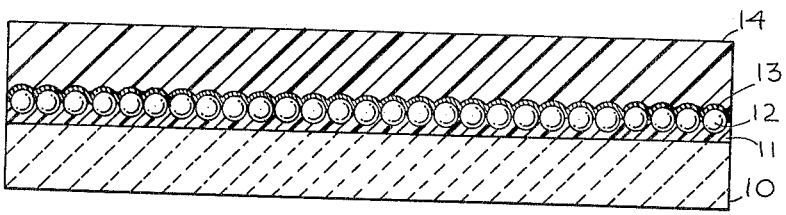
FIGURE 3 shows the FIG. 2 apparatus, but with the addition of a layer of mold material over the abovesaid coating.

Once the metal film is of the proper thickness, a flexible mold material in liquid form is poured over it, the mold material then being allowed to harden by means of the curing process, either at room temperature or in an oven, to form layer 14 in FIG. 3. One desirable mold material is a silicone rubber compound, an example of which is the compound taught in the patent to Charles A. Berriage, entitled "Room Temperature Curing Organopolysiloxane," Patent No. 2,843,555, issued July 15, 1958. This silicone rubber compound cures to a strong, durable, resilient silicone rubber and molds made of this material easily release plastics, even epoxies, without a release agent. This silicone rubber substance is also a desirable material because its low shrinkage ensures accurate reproductions. However, it shows a tendency to stick to some materials, such as the aforesaid silicone potting material, this being one of the reasons mentioned that metal layer 13 was deposited over beads 12, as described above. In curing the combination after the silicone rubber material has been poured over bead layer 12, best results can be obtained by curing for about twelve hours at room temperature. As before, however, the curing process can be expedited by curing at higher temperatures, for example, at 150° Fahrenheit for two to three hours. After the silicone rubber material has been cured, it is hard but flexible and in that respect resembles a hard sheet of rubber.

Although silicone rubber is preferred as a mold material, various other materials can nevertheless be used instead since the physical properties required for a material are (1) that it have the ability to take an accurate cast of the surface on which it is poured or deposited, in this case, metal film 13; (2) toughness to resist physical stress, such as abrasion, pulling, bending, etc., and environmental conditions, such as heat, light, etc.; and (3) the ability to have an epoxy cast or other clear plastic cast taken of its surface and released from these substances. Examples of materials other than silicone rubber that may be used are vinyl plastisol, polypropylene, and the like.

Figure 4:
FIGURE 4 is a representation of a mold from which a backlit projection screen according to the present invention can be made.
Figure 5:
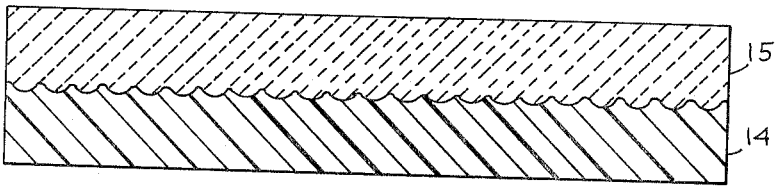
FIGURE 5 illustrates the manner in which the mold is used to fabricate a backlit projection screen of the type under discussion.
Figure 6:
FIGURE 6 is an illustration of a backlit projection screen made from the FIG. 4 mold and shows its lenticular surface structure.

Once the mold material has hardened, it is removed from layer 13 and this can be done simply by pulling layer 14 off of it. The removed mold is shown in FIG. 4 and, as shown, the surface of the mold material that was in contact with layer 13 is completely covered with randomly distributed recesses and protuberances that are each substantially hemispherical in appearance, the recesses, however, being larger than the protuberances. In other words, it can be stated that the mold surface is a duplicate of the undulating configuration of film 13. Consequently, the hemispherically appearing recesses in the mold surface are formed by or are the result of the almost hemispherical bulges of the beads 12 and the thin layer 13 over them whereas the protuberances in the mold surface are formed by or are the result of the filling of the interstices between the beads with the layer 13 material that rounds off these interstices. In rounding off these interstices, the layer 13 material assumes or acquires a hemispherical shape, but of smaller dimension than the hemispherically-shaped mold protuberances described above. To fabricate a backlit projection screen of the kind herein involved, the surface of the mold is covered with a clear epoxy or other clear plastic material, such as methyl methacrylate. In due time, the epoxy or other plastic material will harden to form layer 15 shown in FIG. 5. More particularly, the combination of mold 14 and epoxy 15 is cured, preferably for from twenty-four to forty-eight hours at room temperature, depending on the type of epoxy mixture used. In other words, a slow cure is preferred but not absolutely essential. When layer 15 has been cured to the desired hardness, it is stripped off master mold 14 to provide the desired backlit projection screen, as is shown in FIG. 6. It will be noticed that one surface of this screen is of an undulating configuration, that is to say, it is completely covered with randomly distributed recesses or depressions and protuberances that are substantially hemispherical in their contour, this being the surface that was in intimate contact with the surface of the mold. These substantially hemispherical recesses and protuberances act as tiny lenses and have the effect of projecting the light forward. In other words, because of them, it has been found that a much higher-gain screen is produced.

Having thus described the invention, what is claimed is:

1. A projection screen that more effectively projects a picture or light image, said screen comprising: a transparent screen body having an anterior surface upon which the picture is viewed and a posterior surface upon which the light image is projected, said posterior surface having an undulating configuration with the valleys and crests thereof being randomly distributed, said valleys and crests being spherically round with the radii of curvature of the valleys being significantly different from the radii of curvature of the crests.

2. A projection screen that more effectively projects a picture or light image, said screen comprising: a transparent screen body having an anterior surface upon which the picture is viewed and an undulating posterior surface upon which the light image is projected, the undulations of said posterior surface respectively being made up of differently sized recesses and protuberances that are randomly distributed and substantially hemispherical in shape.

References Cited by the Examiner

UNITED STATES PATENTS

| | | | |
|---|---|---|---|
| 1,206,287 | 11/16 | Auerbacher | 88—28.93 |
| 1,935,471 | 11/33 | Kanolt. | |
| 2,086,556 | 7/37 | Jacobson | 88—28.93 |
| 2,378,252 | 6/45 | Staehle et al. | 88—28.93 |
| 2,480,031 | 8/49 | Kellogg | 88—28.93 |
| 2,508,058 | 5/50 | Bradley | 88—28.9 |
| 2,928,131 | 3/60 | Mahler | 88—28.93 |

FOREIGN PATENTS

| | | |
|---|---|---|
| 444,011 | 7/12 | France. |
| 139,815 | 3/20 | Great Britain. |

JULIA E. COINER, *Primary Examiner.*